(12) United States Patent
Segar et al.

(10) Patent No.: US 6,239,954 B1
(45) Date of Patent: May 29, 2001

(54) READER FOR A LOW-FLYING MAGNETORESISTIVE SENSOR

(75) Inventors: Peter Raymond Segar; Subrahmanyan Nagarajan, both of Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/180,222

(22) PCT Filed: Sep. 4, 1998

(86) PCT No.: PCT/JP98/18385

§ 371 Date: Nov. 2, 1998

§ 102(e) Date: Nov. 2, 1998

(87) PCT Pub. No.: WO99/13459

PCT Pub. Date: Mar. 18, 1999

Related U.S. Application Data

(60) Provisional application No. 60/058,237, filed on Sep. 8, 1997.

(51) Int. Cl.[7] ........................................................ G11B 5/39

(52) U.S. Cl. ............................................. 360/313; 360/128
(58) Field of Search ...................................... 360/325, 313, 360/315, 316, 318, 321, 327, 121, 128

(56) References Cited

U.S. PATENT DOCUMENTS 5,270,892  12/1993  Naberhuis .
5,793,207   8/1998  Gill .

FOREIGN PATENT DOCUMENTS 8-287444  11/1996  (JP) .

*Primary Examiner*—William Klimowicz
(74) *Attorney, Agent, or Firm*—Kinney & Lange, P.A.

(57) ABSTRACT

A reader portion (150) of a magnetoresistive head is disclosed. The reader portion (150) includes a magnetoresistive read element (156) for reading information from a magnetic media (216) and a non-magnetic element (153) to detect and cancel thermal changes in the read head. A spacer (155) is positioned between the magnetoresistive read element (156) and the non-magnetic element (153). A plurality of electrical contacts (166, 167, 168) connect the magnetoresistive read element (156) and the non-magnetic element (153) to external circuitry.

11 Claims, 4 Drawing Sheets

READER FOR A LOW-FLYING MAGNETORESISTIVE SENSOR

This application is a Section 371 national phase application from PCT International Application No. PCT/US98/18385, filed Sep. 4, 1998, which claims priority from U.S. Provisional Application No. 60/058,237, file Sep. 8, 1997.

BACKGROUND OF THE INVENTION

The present invention relates generally to a magnetoresistive head for use in a magnetoresistive read device. In particular, the present invention is a magnetoresistive reader which both identifies thermal asperities and cancels out the effects of thermal asperities during a read function.

A magnetoresistive reader portion of a magnetic read head retrieves magnetically-encoded information that is stored on a magnetic medium or disc. The magnetoresistive reader is typically formed of several layers that include a top shield, a bottom shield, a read element, a bias layer, and a spacer layer. The read element, bias layer, and spacer layer are positioned between a top and bottom shields. The read element is fabricated from a magnetoresistive composition, typically a ferromagnetic material such as nickel-iron (NiFe). The bias layer properly biases the read element along an easy axis of lower coeraivity and the spacer layer provides the necessary separation between the read element and the bias layer.

The read element is fabricated on the read head such that the easy axis is transverse to the direction of disc rotation and parallel to the plane of the disc. Magnetic flux from the disc's surface causes rotation of the magnetization vector of the read element, which in turn causes a change in electrical resistivity of the read element. The change in resistivity of the read element can be detected by passing a sense current through the read element and measuring a voltage across the read element. External circuitry then converts the voltage information into an appropriate format and manipulates that information as necessary.

Due to the low-flying nature of a read head, i.e. the read head is positioned extremely close to a rotating disc, the magnetoresistive reader is susceptible to disc projections or mechanical asperities, which interfere with the read process. Asperities on the disc can come into direct contact with a magnetoresistive read element. When a magnetoresistive read element contacts a mechanical asperity on a disc, the read element undergoes frictional heating and the resistance of the magnetoresistive sensor changes accordingly. This event has been termed a "thermal asperity". A signal spike, having a duration of 1–3 microseconds, will result. During this period, the read element is unable to read.

Another situation which may inhibit or alter the magnetoresistive reader from properly reading the information stored on a disc stems from the disc having a warped surface, rather than a perfectly planar surface. The magnetoresistive read element is biased causing it to be hot relative to its surroundings. The sensor flies very close to the disc which acts as a large heat sink. The proximity of the read element to the disc changes the rate of cooling of the read element and thereby changes the resistive properties of the read element. Dynamic changes in flying height, disc and head modulation, and near contact with asperities can all lead to baseline shifts in the resistance of the read element, thereby inhibiting its reading capabilities.

There is a need for a magnetoresistive read head which can both scan an entire disc surface relatively quickly in order to map out any mechanical asperities on the disc and record the locations of the defective sites so that no data is written to these regions and which can effectively cancel out any thermal asperity effects during a read operation.

BRIEF SUMMARY OF THE INVENTION

The present invention is a reader of a magnetoresistive head. The reader includes a dual strip sensor which comprises a magnetoresistive read element for reading information from a magnetic media and a non-magnetic element. A spacer is positioned between the magnetoresistive read element and the non-magnetic element. A plurality of electrical contacts connect the magnetoresistive read element and the non-magnetic element to external circuitry.

In one preferred embodiment, a non-magnetic element has a size and shape identical to the magnetoresistive read element. A non-magnetic sensor uses a material with a high thermal coefficient of resistivity. During a read operation, a non-magnetic element signal is then subtracted from the magnetoresistive read element signal. With this implementation, the non-magnetic sensor resistance and magnetic properties do not need to be specifically controlled.

In another preferred embodiment, the non-magnetic element is a wide detection element. By having a wide detection element, several tracks can be scanned for mechanical asperities and the locations of the mechanical asperities can be mapped out so that no information is stored in these locations. In addition, the non-magnetic element would physically protrude beyond the magnetoresistive element. Therefore, even the location of mechanical asperities which would not physically touch the read element, but would, due to their close proximity to the magnetoresistive read element, thermally affect the read process can be identified.

DETAILED DESCRIPTION

Figure 1:
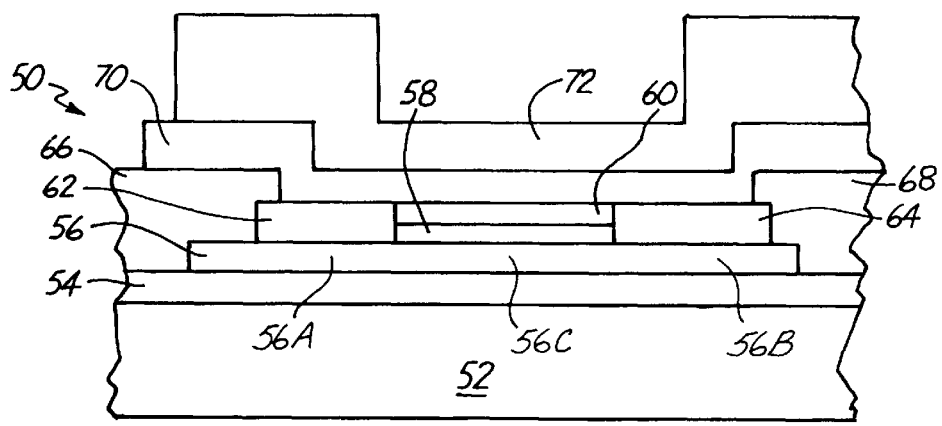
FIG. 1 is a layered diagram of a prior art reader.

FIG. 1 is a layered diagram of prior art reader 50 as viewed from an air bearing surface of the reader. Prior art reader 50 includes bottom shield 52, insulating layer or half-gap 54, magnetoresistive layer 56, spacer 58, bias layer 60, permanent magnet 62 and 64, electrical contacts 66 and 68, insulating layer or half-gap 70, and top shield 72.

Magnetoresistive layer 56 has multiple regions including passive regions 56A and 56B separated by active region 56C. Active region 56C is defined as a region of magnetoresistive layer 56 between permanent magnets 62 and 64. Active region 56C is the region of magnetoresistive layer 56 which reads information from a track of a magnetic storage medium or disc.

During a read operation, prior art reader 50 is positioned adjacent a rotating disc. The information on the disc causes a change in resistivity of active region 56C of magnetoresistive layer 56. A current is passed through magnetoresistive layer 56 via electrical contact 66 and 68 and the voltage across magnetoresistive layer 56 is measured. External circuitry then manipulates the information as necessary.

Prior art reader 50 suffers from two specific situations which may inhibit or alter it from properly reading the information stored on a disc. The first situation is due to the low-flying nature of a read head incorporating prior art reader 50. The read head is positioned extremely close to a rotating disc. Thus, prior art reader 50 is susceptible to disc projections or mechanical asperities which interfere with the read process. Asperities on the disc can come in direct contact with active region 56C of magnetoresistive layer 56. When active region 56C contacts a mechanical asperity on a disc, active region 56C undergoes frictional heating and the resistance of magnetoresistive sensor changes accordingly. This event is called "thermal asperity". A signal spike, having a duration of 1–3 microseconds, will result. During this period, prior art reader 50 is unable to read information from the disc.

A second situation which may alter or inhibit it from properly reading information from the disc stems from a disc having a warped surface, rather than a perfectly planar surface. Magnetoresistive layer 56 is biased causing it to be hot relative to its surroundings. Prior art reader 50 flies very close to the disc which acts as a large heat sink. The proximity of active region 56C to the disc changes the rate of cooling of magnetoresistive layer 56 and thereby changes the resistive properties of magnetoresistive layer 56. Dynamic changes is flying height, disc and head modulation, and near contact with asperities can all lead to unwanted baseline shifts in the resistance of the read element, thereby effecting its reading capability.

Figure 2:
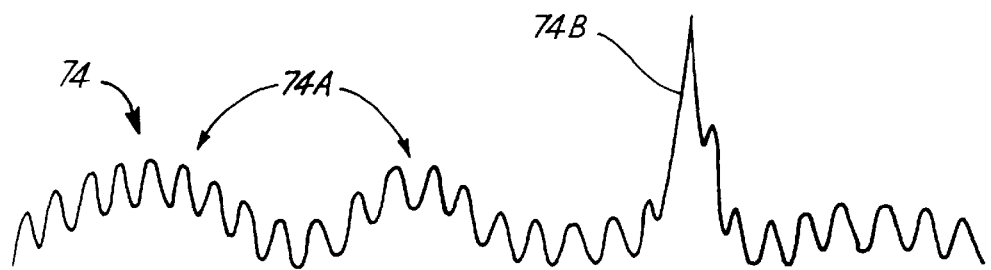
FIG. 2 is a graph representing the signal which is read from a prior art reader of FIG. 1.

FIG. 2 is a graph depicting signal 74 which is read from prior art reader 50 of FIG. 1. Signal 74 is a typical signal, which includes wave portions 74A and spike portion 74B. Wave portions 74A indicate that prior art reader 50 was positioned adjacent a disc which had a warped surface rather than a perfectly planar surface. The peaks of wave portion 74A correspond to a time when the warped of the disc almost came into contact with prior art reader 50. Similarly, spike portion 74B corresponds to a time when prior art reader 50 came in direct contact with a portion of the disc, perhaps due to disc projections or mechanical asperities. Spike portion 74B represents a thermal asperity.

Wave portion 74A and spike portion 74B represent portions of a read signal in which the read signal is either inaccurate or unreadable, respectively. Wave portions 74A and spike portion 74B represent denigrations in the reading capability of prior art reader 50. The present invention addresses these problems of improperly reading information from a disc.

Figure 3:
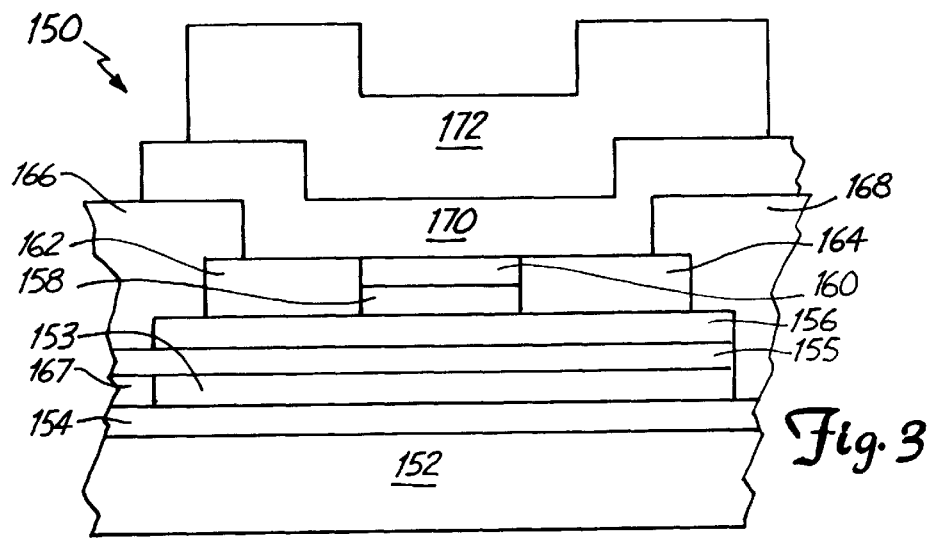
FIG. 3 is a layered diagram of a reader incorporating the present invention.

FIG. 3 is a layered diagram of reader 150 as viewed from an air bearing surface of the reader incorporating the present invention. Reader 150 includes the bottom shield 152, insulating layer 154, non-magnetic layer 153, spacer 155, magnetoresistive layer 156, spacer 158, bias layer 160, permanent magnets 162 and 164, electrical contacts 166, 167, and 168, insulating layer 170, and top shield 172. Insulating layers 154 and 170 are also known as half-gaps.

Elements or layers of reader 150 which are similar to elements or layers of prior art reader 50 are labeled similarly, with the addition of a 1 in front of the number. For instance, bottom shield 152 of reader 150 is identical to bottom shield 52 of prior reader 50.

Reader 150 of FIG. 3 is a dual strip magnetoresistive reader which provides the advantage of achieving thermal compensation and thermal asperity cancellation. Non-magnetic layer 153 and magnetoresistive element 156 each have an active region width in the range of 0.1 microns to 4.0 microns. Non-magnetic layer 153 is formed from any material having a high thermal coefficient of resistivity, such as nickel or aluminum. Spacer layer 155 provides separation between magnetoresistive layer 156 and non-magnetic layer 153.

Prior art dual strip magnetoresistive heads have been fabricated with each sensor formed from a magnetoresistive property. These dual strip magnetoresistive heads have shown to effectively cancel out the thermal asperity affects since the sensors are approximately the same temperature at any given time. However, fabrication and yield issues are considerable with this more complex design since the two magnetoresistive sensors must carefully be aligned, and the resistances and magnetic response must be an identical match to achieve the proper function.

With the design of the present invention shown in FIG. 3, thermal compensation and thermal asperity cancellation can be achieved without the penalties associated with tight tolerance issues discussed above. The cancellation is done by simple subtraction of the signal from non-magnetic layer 153 from the signal of magnetoresistive layer 156. Since non-magnetic layer 153 is not formed from a magnetoresistive material, the fabrication issues are simplified because the resistance and magnetic properties of non-magnetic layer 153 do not need to be precisely controlled.

Figure 4:
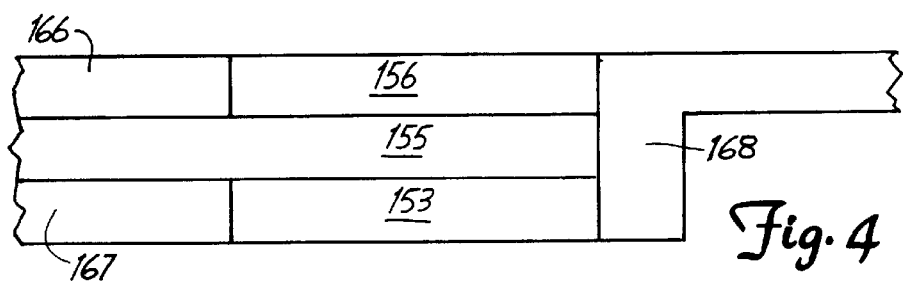
FIG. 4 is a layer diagram of a portion of a reader incorporating the present invention.

FIG. 4 is a layered diagram of a portion of reader 150 incorporating the present invention. FIG. 4 focuses on the dual strip nature of reader 150 and includes non-magnetic layer 153, spacer 155, magnetoresistive layer 156, and electrical contacts 166, 167, and 168. Adjacent layers, such as spacer 158 and bias layer 160 which are fabricated adjacent magnetoresistive layer 156 have been removed for clarity. Since this a view from the air bearing surface of reader 150, a track of rotating disc would rotate past magnetoresistive layer 156 and non-magnetic layer 153 at virtually the same time and in the same number. Thus, the signals read from magnetoresistive layer 156 and non-magnetic layer 153 would be similar in that each signal would include spike portions if the disc would come in contact with magnetoresistive layer 156 and non-magnetic layer 153 and would include wave portions when the distance between reader 150 and the disc would vary. However, the signal from magnetoresistive layer 156 would include additional information relating to the information stored on the disc. Non-magnetic layer 153 would not read this information.

Figure 5A:
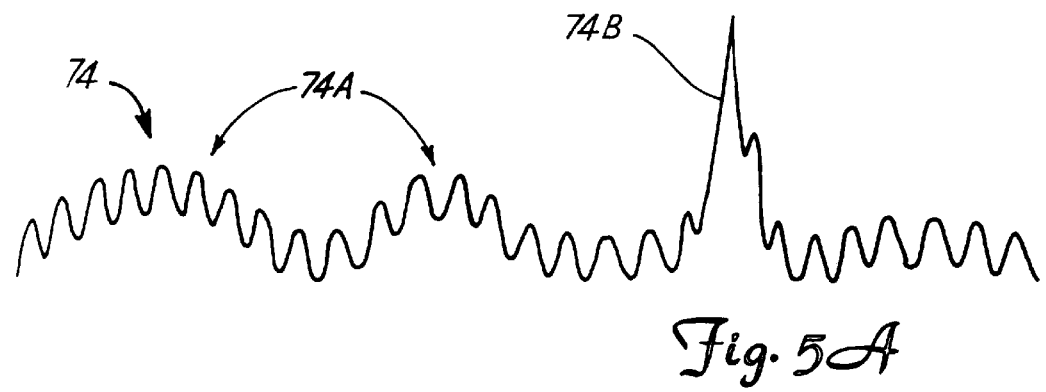
FIG. 5A is a graph representing the signal read from the magnetoresistive element of FIG. 3.
Figure 5B:
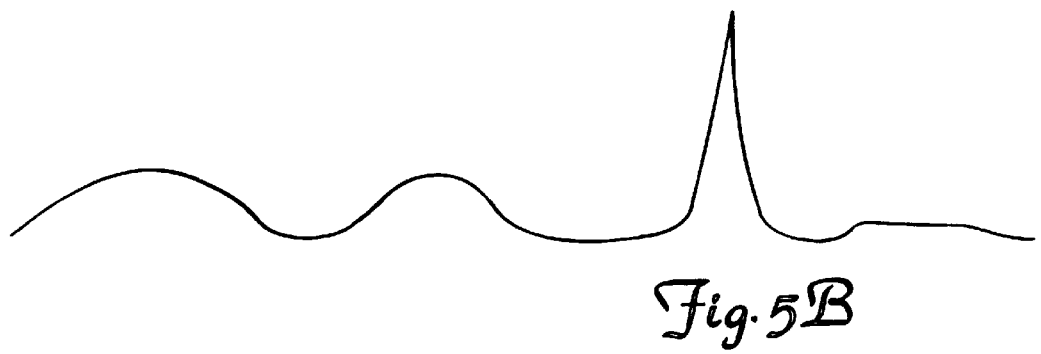
FIG. 5B is a graph representing the signal read from the non-magnetic element of a reader of FIG. 3.

FIGS. 5A and 5B represent a typical signal read from magnetoresistive layer 156 and non-magnetic layer 153, respectively. As you can see, the signal shown in FIG. 5A is identical to the signal shown in FIG. 2 read by prior art reader 50. The signal of magnetic layer 153 shown in FIG. 5B mimics the signal of magnetoresistive layer 156 shown in FIG. 5A except that it does not include the signal representing information which was stored on a disc.

Figure 5C:
FIG. 5C is a graph representing the output signal of the reader of FIG. 3.

FIG. 5C is a signal representing a desired output signal from reader 150. This output signal reader is achieved by simply canceling the signal of non-magnetic layer 153 shown in FIG. 5B from the signal of magnetoresistive layer 156 shown in FIG. 5A. As demonstrated by the signal shown in FIG. 5C, representations of unwanted thermal asperities and thermal compensation have been canceled thereby producing the desired output signal representing information stored on the disc.

Another issue which the present invention addresses is the issue of mapping out mechanical projections or asperities on a disc prior to writing data to the disc. It is desirous that, the mechanical projections or asperities of a disc are located and recorded so that no data is rewritten to these defective sites or regions. In the prior art, implementing such an approach requires a long time for each data head to scan an entire disc surface. This must be done is quarter track width to get complete and the disc is scanned radially in 40–50 micron steps.

Magnetoresistive read elements vary in width from 1.0 microns to 4.0 microns and include 2.5 microns in mature products and 2 microns or less in current or future products. Due to the width of these elements, it will require a drive to spend a significant amount of time, such as 8–12 hours, searching for the defects. In addition, existing magnetoresistive read elements are most reliable when a low amount of current is supplied to the element. However, the more current that is passed into the element, the greater the probability of detecting asperities. Thus, there is a trade-off of prior art magnetoresistive heads between reliable reading and proper detection of asperities.

To solve the problem of surface coverage, one would like to employ a wide detection element. To solve the problem of asperity height one would like to employ a sensor which physically protrudes closer to the rotating disc than the magnetoresistive sensor. For overcoming the noise from media magnetics during mapping, one would like a sensor less sensitive to magnetics. Lastly, one would like to improve sensitivity to asperities during mapping by using a higher biased current.

Figure 6:
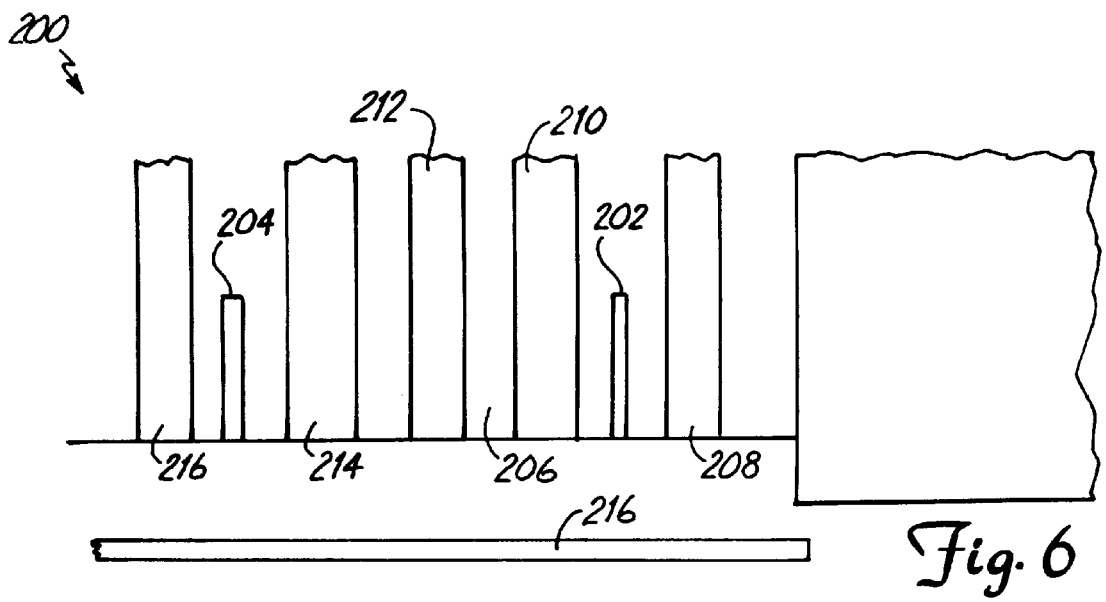
FIG. 6 is a layered diagram depicting a magnetoresistive element and a non-magnetic element of a first embodiment of the present invention.
Figure 7:
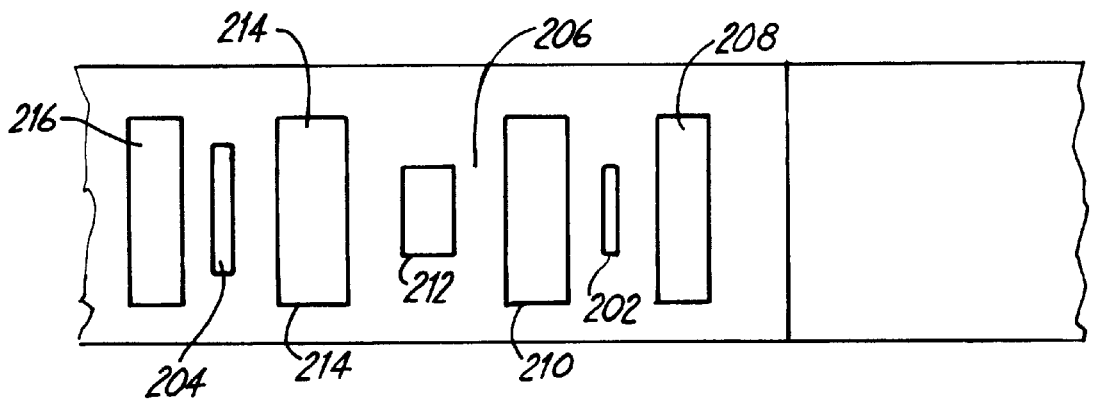
FIG. 7 is a layered diagram as viewed from the air bearing surface of the first embodiment of the present invention.

FIG. 6 is a layered diagram of magnetoresistive sensor 200 depicting magnetoresistive element 202 and non-magnetic element 204 of a first alternate embodiment of the present invention. Several layers not pertinent to this discussion have been removed for clarity. As shown in FIG. 6, magnetoresistive sensor 200 includes magnetoresistive element 202, non-magnetic element 204, write gap 206, Sendust layer 208, and shields 210, 212, 214, and 216. FIG. 6 also shows disc 218 which would be rotating under magnetoresistive sensor 200. FIG. 7 is a layered diagram as viewed from the air-bearing surface of magnetoresistive sensor 200 shown in FIG. 6.

As shown in FIGS. 6 and 7, non-magnetic element 204 is a wide resistive element formed from any non-magnetic material which is susceptible to heat transfer, such as nickel or aluminum.

The design of magnetoresistive sensor 200 shown in FIGS. 6 and 7 utilizes a wide resistive element, as compared to magnetoresistive element 202, for non-magnetic element 204 as an asperity sensor. A wide element used for non-magnetic element 204 significantly cuts down on the amount of time used to scan locations of all tracks of a disc and to detect and map out all thermal asperities. In addition, the use of a non-magnetic material can be used whether or not the magnetic media is DC erased. No information will be stored at these locations. In addition, a higher biased current can be provided through a non-magnetic element 204 which would improve the sensitivity to asperities during a mapping process. The width of non-magnetic element 204, as compared to a magnetic element, would be in the range of 10–100 microns which would allow a disc surface to be scanned very quickly. In comparison, the width of magnetoresistive element 202 is in the range of 0.1 to 4.0 microns.

Figure 8:
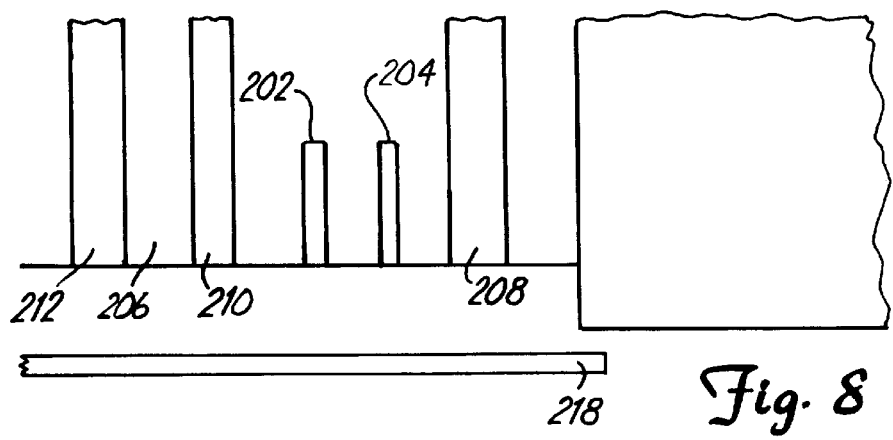
FIG. 8 is a layered diagram depicting a magnetoresistive element and a non-magnetic element of a second embodiment of the present invention.
Figure 9:
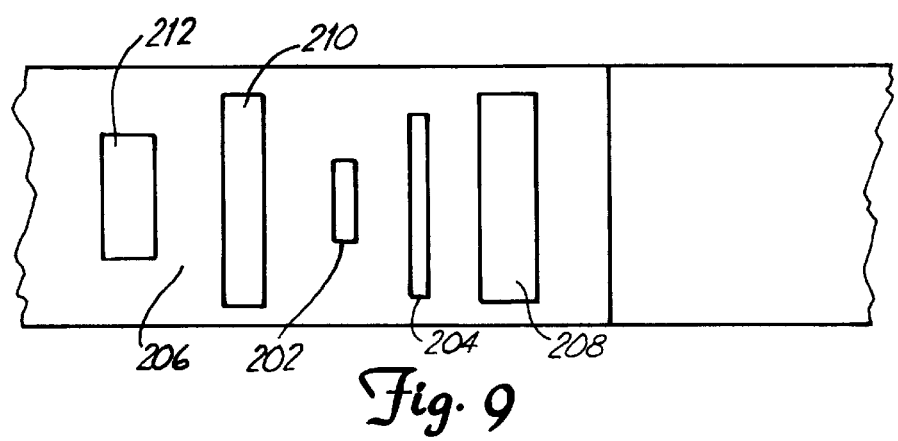
FIG. 9 is a layered diagram as viewed from the air bearing surface of a second embodiment of the present invention.

FIGS. 8 and 9 represent layered diagrams depicting a second alternate embodiment of the present invention. FIGS. 8 and 9 depict magnetoresistive element 202 and non-magnetic element 204 positioned between shields 210 and 212. The advantage of this approach is that additional shields are not necessary.

Figure 10:
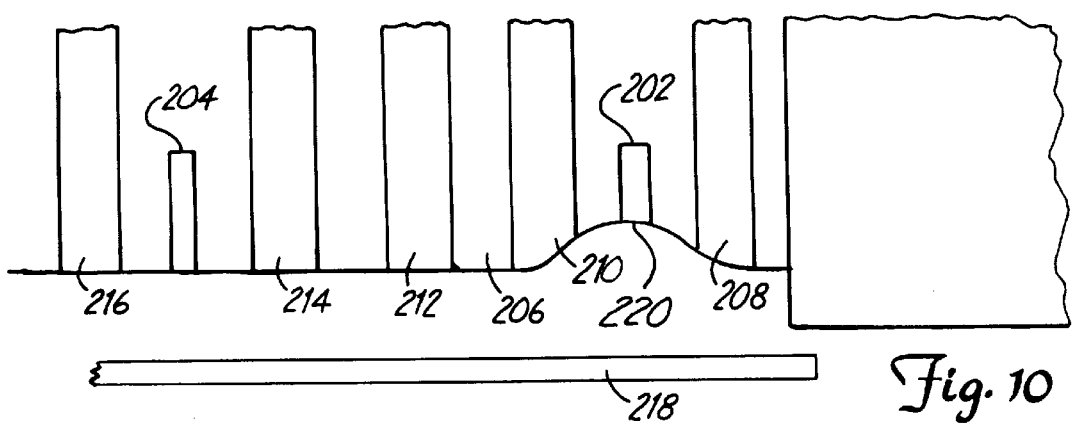
FIG. 10 is a layered diagram depicting a magnetoresistive element and a non-magnetic element of a third embodiment of the present invention.

FIG. 10 depicts a layered diagram showing a third alternate embodiment of the present invention. While this third alternate embodiment of magnetoresistive sensor is very similar to that shown in FIGS. 6 and 7, magnetoresistive element 202 is positioned on recession 220. Therefore, non-magnetic element 204 is in closer proximity to disc 218 than magnetoresistive element 202. Thus, non-magnetic element 204 would have the capability of detecting mechanical asperities which would not come in contact with magnetoresistive element 202, however would effect the reading capabilities due to heat transfer.

With all of the embodiments shown in FIGS. 6–10, the magnetoresistive element and the non-magnetic layer or element are connected to external circuitry via electrical contacts, such as contacts 166, 167, and 168. However it is understood that other electrical configurations can connect these elements to external circuitry, such as two separate sets of contacts.

The present invention is magnetoresistive read head which provides the dual purposes of effectively canceling out any thermal asperity affects during a read operation and which can scan an entire disc surface relatively quickly in order to map out any mechanical asperities on the disc and record the locations of the defective sites so that no data is written to these regions.

Although the present invention has been described with reference to preferred embodiments, workers skilled in the art will recognize that changes may be made in form and detail without departing from the spirit and scope of the invention.

What is claimed is:

1. A reader of a magnetoresistive head of a magnetic data storage and retrieval system, the reader comprising:
    a magnetoresistive element having a width of about 0.1 microns to about 4.0 microns; and
    means for detecting locations of mechanical asperities to prevent data storage at those locations, the means having an effective width of about 10 microns to about 100 microns.

2. A reader of a magnetoresistive head of a magnetic data storage and retrieval system, the reader comprising:
    a magnetoresistive read element having a width of about 0.1 microns to about 4.0 microns;
    a non-magnetic wide detection element for use in detecting locations of mechanical asperities to prevent data storage at those locations, the non-magnetic wide detection element having a width of about 10 microns to about 100 microns;

a spacer positioned between the magnetoresistive read element and the non-magnetic wide detection element; and a plurality of electrical contacts connecting the magnetoresistive read element and the non-magnetic wide detection element to external circuitry.

3. The reader of claim 2 wherein the spacer in an insulator.

4. The reader of claim 2 wherein the spacer is formed from aluminum.

5. The reader of claim 2 wherein the non-magnetic wide detection element is formed from a metal substance.

6. The reader of claim 2 wherein the non-magnetic wide detection element is formed from nickel.

7. The reader of claim 2 and further comprising:

a bias layer for biasing a magnetization property of the magnetoresistive read element; and a spacer layer positioned between the magnetoresistive read element and the bias layer.

8. The reader of claim 2 and further comprising:

a plurality of nickel-iron layers separated by a plurality of gap layers positioned between the magnetoresistive read element and the non-magnetic wide detection element.

9. The reader of claim 2 wherein the non-magnetic wide detection element is positioned in closer proximity to the magnetic media than the magnetoresistive read element is positioned to the magnetic media.

10. The reader of claim 2 wherein a bias current provided through the non-magnetic wide detection element is greater than a bias current provided through the magnetoresistive read element.

11. A method for preventing magnetic data storage at locations on a magnetic media containing a mechanical asperity, the method comprising:

using a transducing head to scan a surface of a magnetic media to detect locations of mechanical asperities, the transducing head comprising a magnetoresistive read element and a wide detection element, the magnetoresistive read element having a width of about 0.1 microns to about 4.0 microns and the wide detection element having a width of about 10 microns to about 100 microns;

providing a magnetoresistive read element bias current through the magnetoresistive read element;

providing a wide detection element bias current through the wide detection element, the wide detection element bias current being greater than the magnetoresistive read element bias current; and mapping and recording the locations of detected mechanical asperities.

* * * * *

UNITED STATES PATENT AND TRADEMARK OFFICE
CERTIFICATE OF CORRECTION

PATENT NO.    : 6,239,954 B1
DATED         : May 29, 2001
INVENTOR(S)   : Peter Raymond Segar et al.

It is certified that error appears in the above-identified patent and that said Letters Patent is hereby corrected as shown below:

<u>Column 7,</u>
Line 7, delete "in", insert -- is --.

Signed and Sealed this

Eighth Day of April, 2003

JAMES E. ROGAN
*Director of the United States Patent and Trademark Office*